United States Patent [19]

Helmich et al.

[11] Patent Number: 4,708,094

[45] Date of Patent: Nov. 24, 1987

[54] FUEL CONTROL SYSTEM FOR DUAL FUEL ENGINES

[75] Inventors: Melvin J. Helmich; William P. Ryan; David H. Marvin, all of Grove City, Pa.

[73] Assignee: Cooper Industries, Houston, Tex.

[21] Appl. No.: 941,658

[22] Filed: Dec. 15, 1986

[51] Int. Cl.⁴ .............................................. F02B 3/00
[52] U.S. Cl. ................................ 123/27 GE; 123/575; 123/526
[58] Field of Search ............... 123/525, 526, 527, 575, 123/27 GE

[56] References Cited

U.S. PATENT DOCUMENTS

| 3,577,877 | 5/1971 | Warne | 123/526 |
| 4,227,497 | 10/1980 | Matheson | 123/575 |
| 4,230,072 | 10/1980 | Noguchi et al. | 123/575 |
| 4,278,064 | 7/1981 | Regueiro | 123/575 |
| 4,416,244 | 11/1983 | McDonald | 123/523 |
| 4,489,699 | 12/1984 | Poehlman | 123/575 |
| 4,597,364 | 7/1986 | Young | 123/526 |
| 4,641,625 | 2/1987 | Smith | 123/527 |

Primary Examiner—E. Rollins Cross
Attorney, Agent, or Firm—E. E. Scott; R. L. Maxwell

[57] ABSTRACT

Disclosed herein is an apparatus which is adapted for controlling fuel flows for dual fuel compression ignition engines. The disclosed system includes a lag fuel governing system in conjunction with a lead fuel governing system which includes spontaneous motion metering means. The lag fuel governing system includes means for providing a first signal indicative of the position of the lead fuel metering means, which signal approximates total load on the engine; means for providing a second signal representative of a selected percentage of lead fuel relative to total load; means for controlling flow of said lag fuel to said engine, which flow causes movement of said lead fuel metering means; means for determining the difference between said first signal and said second signal, which difference is indicative of distance the lead fuel metering means must be moved to attain the selected percentage of lead fuel relative to total load; and means for causing operation of said means for controlling flow of said lag fuel to said engine to cause movement of said lead fuel metering means equal to the distance the lead fuel rack must be moved to attain the select percentage of lead fuel relative to total load.

10 Claims, 2 Drawing Figures

FUEL CONTROL SYSTEM FOR DUAL FUEL ENGINES

BACKGROUND OF THE INVENTION

1. Field of the Invention

This invention relates generally to fuel control systems for dual fuel engines and, more particularly, to such systems having a lead fuel governing system and a log fuel governing system.

2. Description of the Prior Art

Constant energy input to a dual fuel compression ignition engine is required for consistent and stable operation. Considerable difficulty has been experienced in attempting to maintain constant energy input to dual fuel compression ignition engines during variation of fuel schedule and/or load and/or heat content of supplied fuels. Hence, disturbed and erratic operation of dual fuel compression ignition engines has become a problem whenever one or more of the aforementioned variations are present.

A number of fuel control systems for dual fuel engines have heretofore been proposed. Examples can be found in U.S. Pat. No. 4,278,064 to Regueiro, U.S. Pat. No. 4,489,699 to Poehlman, and U.S. Pat. No. 4,416,244 to McDonald. Each of the foregoing lack features of the present invention, disclosed and claimed herein, which features operate to overcome the problems mentioned in the preceding paragraph, and which, by overcoming those problems, serve to provide a fuel control system for dual fuel engines that is much improved over invention is more flexible than that disclosed in U.S. Pat. No. 4,278,064 as it is capable of handling gases of different heat value and quantities, more variable than that disclosed in U.S. Pat. No. 4,489,699 as it has more selector options, and more totally variable with regard to load than that disclosed in U.S. Pat. No. 4,416,244 as it is not relatively restrictive from the standpoint of control through a variable load range.

SUMMARY OF THE INVENTION

The present invention provides an improved fuel control system for dual fuel compression ignition engines by using a lag fuel governing system in conjunction with a lead fuel governing system which includes spontaneous motion metering means. The lag fuel governing system of the present invention includes means for providing a first signal indicative of the position of the lead fuel metering means, which signal approximates total load on the engine; means for providing a second signal representative of a selected percentage of lead fuel relative to total load; means for controlling flow of said lag fuel to said engine, which flow causes movement of said lead fuel metering means; means for determining the difference between said first signal and said second signal, which difference is indicative of distance the lead fuel metering means must be moved to attain the selected percentage of lead fuel relative to total load; and means for causing operation of said means for controlling flow of said lag fuel to said engine to cause movement of said lead fuel metering means equal to the distance the lead fuel rack must be moved to attain the select percentage of lead fuel relative to total load. In the specific embodiments disclosed herein the lead fuel is fuel oil and the lag fuel is fuel gas.

It is an object of the present invention, therefore, to provide an improved fuel control system for dual fuel engines.

Another object of the present invention is to provide an improved fuel control system for dual fuel engines having both a lead fuel (fuel oil) and lag fuel (fuel gas).

Yet another object of the present invention is to improve steady state stability of dual fuel engines.

Still yet another object of the present invention is to improve performance of dual fuel engines during load transients.

A further object of the present invention is to provide a variable lag fuel governing system, the variability of which allows an infinite number of combinations of fuel blends to be delivered to a dual fuel engine.

A still further object of the present invention is to provide a simple control for an especially adapted engine for dual fuel operation, low BTU fuel applications, blended fuel gas applications, and variable pilot oil applications.

Other objects, advantages, an novel features of the invention will become apparent from the following description of the preferred embodiments when considered in conjunction with the accompanying drawings wherein:

DESCRIPTION OF THE PREFERRED EMBODIMENTS

Figure 1:
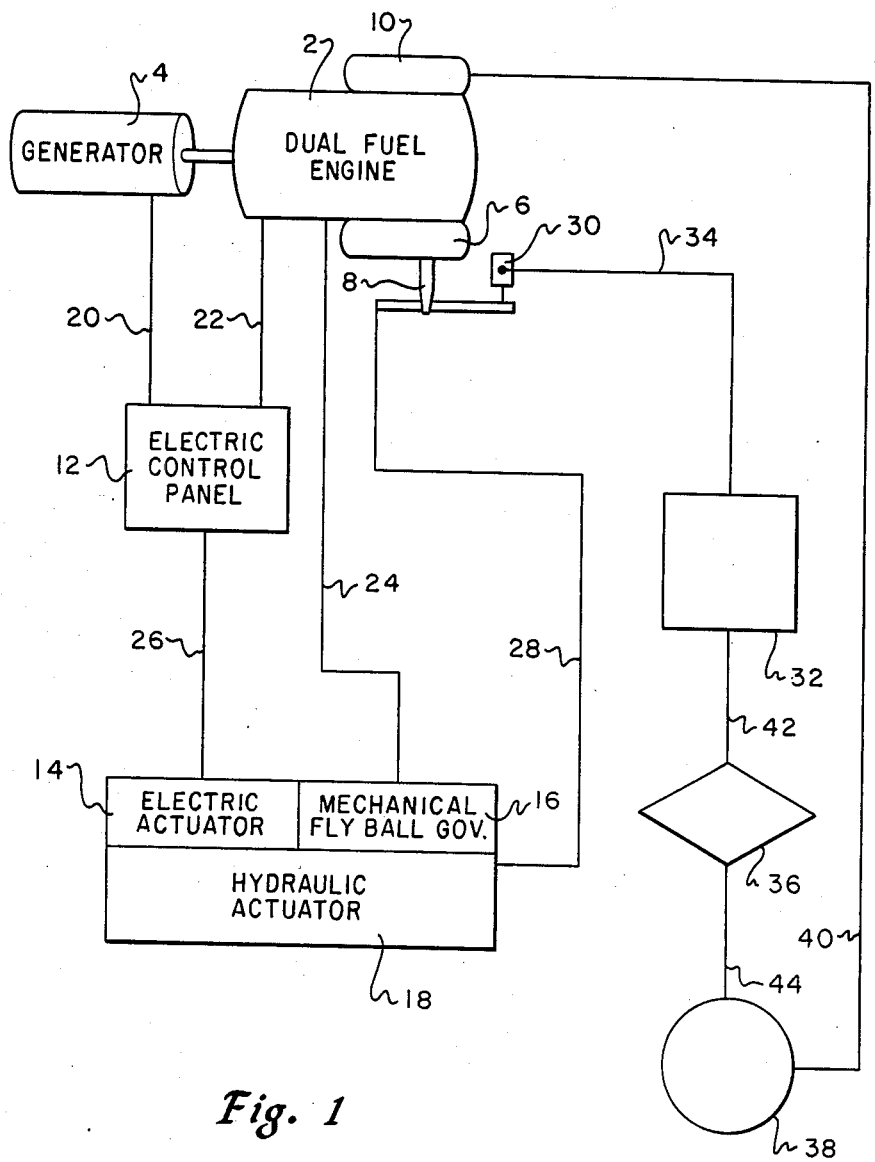
FIG. 1 is a schematic drawing of one embodiment of the fuel control system of the present invention.

Referring to FIG. 1, a fuel control system for a dual fuel engine 2 driving an electric generator 4 is shown therein. In that embodiment, a first or lead fuel, oil, is delivered from an oil fuel source (not shown) to engine 2 by an oil pump 6 which includes a meter rack 8, which constitutes a motile, measurable metering means. A second or lag fuel, gas, is delivered from a gaseous fuel source (not shown) to engine 2 by a gas manifold 10. Engine 2 is governed, in part, by conventional governor control elements including an electric control panel 12, an electric actuator 14, a mechanical fly ball governor 16, and a main hydraulic actuator 18. Also included are means 20 for transmitting electric load feedback from generator 14 to panel 12, means 22 for transmitting engine speed feedback from engine 2 to panel 12, means 24 for transmitting engine speed feedback from engine 2 to the mechanical fly ball governor 16, means 26 for transmitting an electric speed error signal from panel 12 to electric actuator 14, and means 28 for transmitting an electric/mechanical fuel oil command from main hydraulic amplifier 18 to fuel meter rack 8. As how the aforementioned conventional governor control elements are connected and how they operate individually and together to govern engine 2 are well known to those skilled in the art, it is deemed unnecessary to describe the specifics of element connection and operation herein. General configuration of those elements, however, is clearly shown in the schematic drawing of FIG. 1.

Continuing to refer to FIG. 1, the control system of the present invention is shown to include an element 30, the purpose of which is to provide a signal indicative of the position of the lead fuel metering means, i.e., rack position, which signal can be expected to reasonably approximate total load on engine 2 given that rack position and engine torque delivery are fairly linear. A linear variable differential transformer (LVDT), such as LVDT transducer Model No. 7311-V2-AO manufactured by Pickering & Company could serve as element 30. Of course, those skilled in the art should be able to readily identify other products and/or constructable apparatus which could serve as element 30, the only requirement imposed on that element to bring it within the scope of the present invention being that it provide the above described signal.

The control system of the present invention also includes means for providing a signal representative of a selected percentage of lead fuel relative to total load and means for determining the difference between that signal and the signal provided by element 30, which difference, based on the conditions upon which the signals arise in the embodiment shown, is indicative of distance the lead fuel rack 8 must be moved to attain a selected percentage of lead fuel relative to total load. The provided signal of the former means would most likely originate from an engine operator, who based upon type of engine operation desired, could select one of any number of percentages or, as they are frequently called in the art, "setpoints". Both of the above specified means could be provided by a Proportional/Integral/Derivative (PID) controller, in which case element 32 in FIG. 1 would designate such a controller; otherwise, element 32 would designate another source or sources of the means. PID controllers, like LVDT's, are well known to those skilled in the art, and also as was the case with element 30, those skilled in the art should be able to readily identify other products and constructable apparatus which could serve as element 32, the only requirement imposed on that element to bring it within the scope of the present invention being that it served as the aforementioned means. By way of example, a PID controller which has been used in a successful test of the present invention is Digital Controller Model 352B/372 manufactured by Moore Products. A particularly desirable although not uncommon feature of that controller, which feature would be present in preferred embodiments of the present invention for reasons set forth below, is capability of being dynamically tuned for slow recovery.

Transmitting the signal indicative of rack 8 position from element 30 to element 32 is signal transmitting means 34, which could be a wire, for example, if the signal was an electric signal. Any appropriate signal transmitting means can be employed provided it is capable of transmitting the signal generated by element 30 to element 32.

The difference between the signals described above, which difference is indicative of distance the lead fuel rack 8 must be moved to attain the selected percentage of lead fuel relative to total load, is used by means 36 operating in conjunction with means 38 for controlling flow of lag fuel to engine 2, which flow causes displacement of said lead fuel rack 8. Means 36 causes operation of means 38 to cause displacement of said lead fuel rack 8 equal to the distance the lead fuel rack 8 must be moved to attain the select percentage of lead fuel relative to total load. By way of example, an electric/pneumatic converter could serve as means 36 and a gas pressure regulator connected by means 40 to manifold 10 so that regulated gas flow causes proportional displacement of rack 8 could serve as means 38. Other examples should readily occur to those skilled in the art, as well as should appropriate connecting means 42, 44 for connecting elements 32 to 36 and 36 to 38, respectively, as required.

Based on the foregoing, the governing system for engine 2 shown in FIG. 1 comprises two governing systems: a first or lead fuel governing system, which includes conventional elements 14, 16, and 18; and a second or lag fuel governing system, which includes elements 30, 32, 36, and 38. By design, described further below, in the preferred embodiments disclosed herein, which embodiments employ fuel oil as the lead fuel, primary governing functions, such as speed and load control, isochronous load sharing, and so on, are performed by the lead fuel governor to take advantage of the improved performance achieved during load transients with fuel oil versus fuel gas. It has also been proved that fuel oil pumps, such as pump 6, are precise metering devices. The purpose of the second, or lag fuel gas governor, is to deliver fuel gas to engine 2 for combustion so that less fuel oil is consumed. As fuel gas is generally less expensive than fuel oil, it may be desirable in many applications in which the present invention may be employed to deliver sufficient fuel gas to engine 2 to reduce the fuel oil meter rack 8 to a predetermined minimum setting which provides a reliable ignition source without causing flame out. However, any percentage of fuel oil to total load from a minimum for ignition to 100% may be selected and implemented by the present invention via element 32.

In operation, after fuel oil meter rack setpoint is selected, a signal generated by element 30 in response to its measurement of rack position, which signal is indicative of total load on the engine 2, is transmitted to element 32 where it is compared to the selected setpoint. Provided that element 32 is capable of being dynamically tuned and is dynamically tuned for slow recovery, primary transient governing control will be forced upon the lead fuel governing system, whereupon the lag fuel governor will function to restore rack 8 to its set point after stabilization of that rack 8 after displacement caused by a reaction of the lead fuel governor to a transient condition. Obviously, within the limits of, for example, an involved valve, in, for example, a pressure regulator serving as element 38, reaching either extreme of being fully opened or fully closed, element 32 will force change in gas flow until the fuel meter rack set point is achieved. Should an involved valve completely close, engine 2 will automatically operate on fuel oil only. Should an involved valve open completely without achieving a selected set point, the fuel oil governor will make up for the fuel gas deficiency by delivering sufficient fuel oil to maintain the fuel oil governor speed and load set point. It should be appreciated by those skilled in the art that the above described system provides an improved fuel governing system for dual fuel engines, which system should improve steady state stability, load transient response time, and performance and, further, which simplifies controls for dual fuel operation, low BTU fuel applications, blended fuel gas applications, and variable fuel oil applications.

Figure 2:
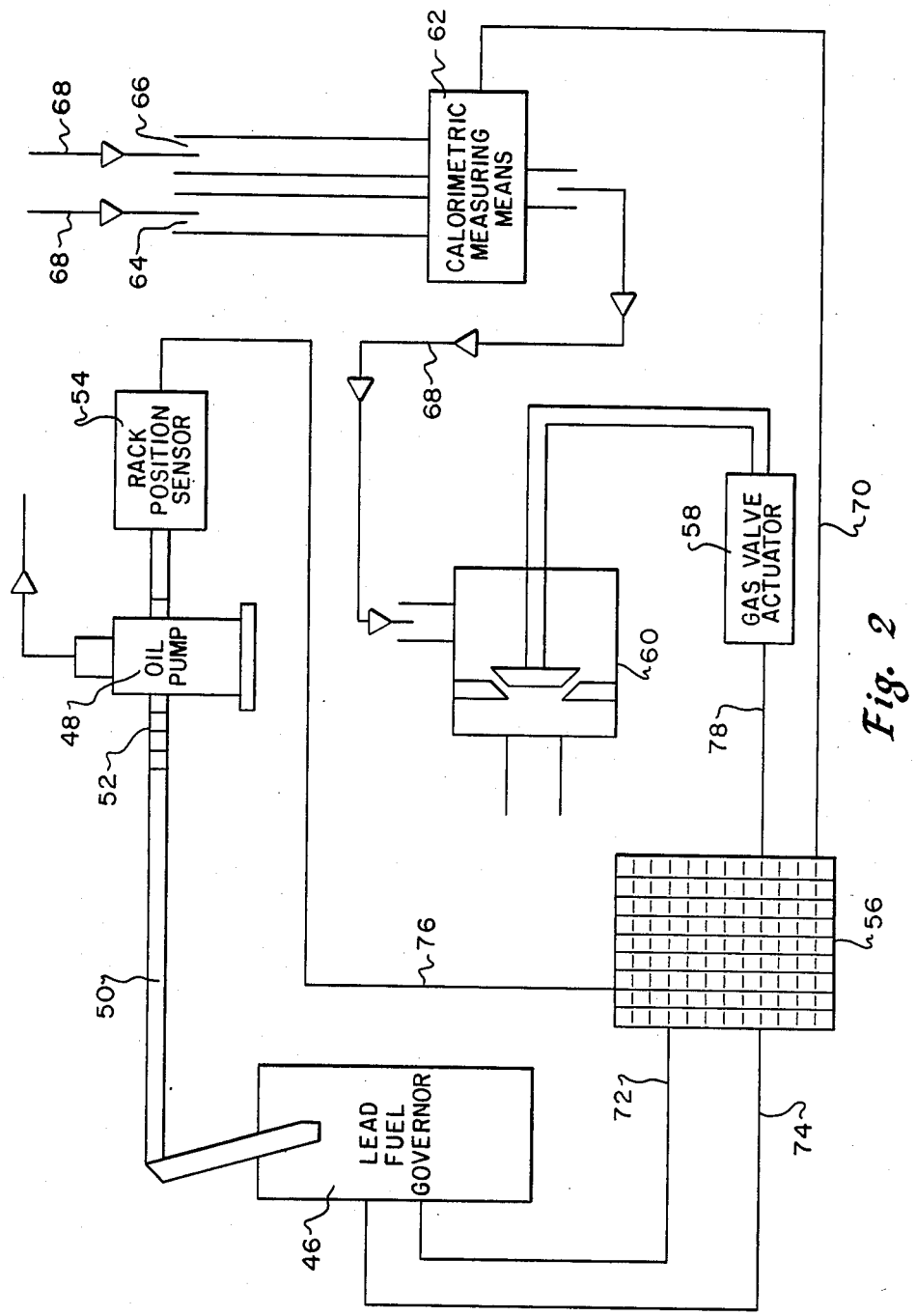
FIG. 2 is a schematic drawing of another embodiment of the fuel control system of the present invention.

Another embodiment of the present invention is shown schematically in FIG. 2. In view of the description of the embodiment above, those skilled in the art should readily comprehend the construction and operation of this embodiment. Because, however, of subtle differences between parts of the embodiments of FIGS. 1 and 2, which differences led to a decision not to attempt to use like numerals to designate identical or corresponding elements in the drawings, it should be noted that shown in FIG. 2 are lead fuel governor 46; oil pump 48; governor linkage 50 connecting governor 46 and pump 48, said linkage 50 having a rack portion 52; a rack position sensor 54; a microprocessor 56; gas valve actuator 58; gas valve 60; and calorimetric measuring means 62. This latter means, not present in the embodiment of FIG. 1, includes openings 64, 66 for gas input (direction of gas flow indicated by arrowed lines 68; the gas, of course, would be contained while flowing within the system within gas containing means, which means are not shown) and means for taking calorimetric measurements of the fuel gas, blended or otherwise, coming into the system and transmitting (said transmission designated by line 70) said measurements to microprocessor 56. Microprocessor 56 also receives input from the governor 46 as to load and speed condition, via transmission lines 72 and 74, respectively and, further, input as to, essentially, heat energy delivered to the engine (not shown) by the fuel oil via transmission line 76 which transmits a signal indicative of rack position as measured by position sensor 54. Given that microprocessor 56 is programmed to know total energy requirements of the engine (not shown) at a given load and speed condition, based upon the various inputs, microprocessor 56 generates output via output transmission line 78 to gas valve actuator 58, which output controls that actuator 58 so that heat energy delivered by the fuel gas and heat energy delivered by the fuel oil equal total energy requirements at any given load and speed condition. It should be appreciated that a major improvement of this embodiment over the prior art lies in its inclusion of calorimetric measuring means 62, which means contributes to ensure that constant energy is delivered to the engine (not shown) even when variable heat rate fuels are utilized.

Obviously, although only two embodiments are described herein, many modifications and variations of the present invention are possible in light of the above teachings. It is therefore to be understood that within the scope of the appended claims, the invention may be practiced otherwise than as specifically described.

We claim:

1. A fuel governing system for an engine adapted for operation on a first fuel and a second fuel, said system comprising:
   a first fuel governing system including a spontaneous motion metering means; and
   a second fuel governing system, said second fuel governing system further comprising:
   means for providing a first signal indicative of position of the first fuel metering means, which signal approximates total load on the engine,
   means for providing a second signal of the selected percentage of first fuel relative to total load,
   means for controlling flow of said second fuel to said engine, which flow causes reflective displacement of said first fuel metering means,
   means for determining the difference between said first signal and said second signal, which difference is indicative of distance the first fuel metering means must be moved to attain the selected percentage of first fuel relative to total load, and
   means for causing operation of said means for controlling flow of said second fuel to said engine to cause displacement of said first fuel metering means equal to the distance the first fuel metering means must be moved to attain the selected percentage of first fuel relative to total load.

2. The fuel governing system of claim 1 wherein: said first fuel oil and said second fuel is fuel gas.

3. A lag fuel governing system for an engine for driving variable loads at variable speeds and adapted for operation on a lead fuel and a lag fuel, said engine having a lead fuel governing system having a response time and including a metering rack for performing primary governing functions, said lag fuel governing system comprising:
   means for providing a first signal indicative of lead fuel rack position, which signal approximates total load on the engine;
   means for providing a second signal representative of a selected percentage of lead fuel relative to total load;
   means for controlling flow of said lag fuel to said engine, which flow causes displacement of said lead fuel rack;
   means for determining the difference between said first signal and said second signal, which difference is indicative of distance the lead fuel rack must be moved to attain the selected percentage of lead fuel relative to total load; and
   meand for causing operation of said means for controlling flow of said lag fuel to said engine to cause displacement of said lead fuel rack equal to the distance the lead fuel rack must be moved to attain the selected percentage of lead fuel relative to total load.

4. The lag fuel governing system of claim 3 wherein said means for providing a first signal indicative of lead fuel rack position, which signal approximates total load on the engine, further comprises a linear variable differential transformer.

5. The lag fuel governing system of claim 3 wherein said means for providing a second signal representative of a selected percentage of lead fuel relative to total load and said means for determining the difference between said first signal and said second signal, which difference is indicative of distance the lead fuel rack must be moved to attain the selected percentage of lead fuel relative to total load, further comprise a proportional/integral/derivative controller.

6. The lag fuel governing system of claim 5 wherein said proportional/integral/derivative controller having means to establish lag fuel response time, which means are set so that lag fuel response time is slower than lead fuel response time.

7. The lag fuel governing system of claim 6 wherein said means for providing a first signal indicative of lead fuel rack position, which signal approximates total load on the engine, further comprises a linear variable differential transformer.

8. In an internal combustion engine for driving variable loads at variable speeds and adapted for operation on first and second fuels, means for providing constant heat energy from the fuel flows to the engine at a given load and speed condition comprising:
   means for providing a first signal representative of heat energy required by the engine at the given load and speed condition;
   means for providing a second signal representative of heat energy delivered to the engine by flow of the first fuel;

means for regulating rate of flow of the second fuel, which flow delivers known heat energy to the engine at varying rates;

means for determining the difference between the quantities represented by the first and second signals, which differences are required heat energy;

means for determining rate of flow of the second fuel to provide heat energy to the engine equal to the required heat energy; and means for allowing flow of said second fuel at a rate which provides heat energy to the engine equal to the required heat energy.

9. The means of claim 8 further comprising means for determining heat energy delivered to the engine at varying flow rates of the second fuel.

10. The means of claim 9 wherein the means for determining heat energy delivered to the engine at varying flow rates of the second fuel comprises second fuel calorimetric measuring means.

* * * * *